(12) United States Patent
Schnorbus

(10) Patent No.: US 9,951,681 B2
(45) Date of Patent: Apr. 24, 2018

(54) COMPRESSOR SYSTEM FOR A COMBUSTION ENGINE AND COMBUSTION ENGINE

(71) Applicant: FEV GMBH, Aachen (DE)

(72) Inventor: Thorsten Schnorbus, Aachen (DE)

(73) Assignee: FEV GmbH, Aachen (DE)

( * ) Notice: Subject to any disclaimer, the term of this patent is extended or adjusted under 35 U.S.C. 154(b) by 125 days.

(21) Appl. No.: 14/963,668

(22) Filed: Dec. 9, 2015

(65) Prior Publication Data

US 2016/0160749 A1 Jun. 9, 2016

(30) Foreign Application Priority Data

Dec. 9, 2014 (DE) .................. 10 2014 118 247

(51) Int. Cl.
| | | |
|---|---|---|
| *F02B 33/44* | (2006.01) | |
| *F02B 33/00* | (2006.01) | |
| *F02B 39/10* | (2006.01) | |
| *F02B 39/12* | (2006.01) | |
| *F02B 63/04* | (2006.01) | |
| *B60K 6/485* | (2007.10) | |
| *F02N 11/00* | (2006.01) | |
| *F02B 39/04* | (2006.01) | |
| *F02N 11/04* | (2006.01) | |

(52) U.S. Cl.
CPC .............. *F02B 39/10* (2013.01); *B60K 6/485* (2013.01); *F02B 39/04* (2013.01); *F02B 39/12* (2013.01); *F02B 63/04* (2013.01); *F02N 11/003* (2013.01); *F02N 11/006* (2013.01); *F02N 11/04* (2013.01)

(58) Field of Classification Search
CPC .......... F02B 39/10; F02B 39/04; F02B 39/12; F02B 63/04; F02N 11/003; F02N 11/006; F02N 11/04; B60K 6/485; B60K 6/442
USPC ........... 60/607–608; 123/559.1–559.3; 475/5
See application file for complete search history.

(56) References Cited

U.S. PATENT DOCUMENTS

| | | | | |
|---|---|---|---|---|
| 4,514,991 A | * | 5/1985 | Zinsmeyer | ............... F16H 3/72 475/2 |
| 6,705,416 B1 | * | 3/2004 | Glonner | ................ B60K 6/442 475/5 |
| 6,718,955 B1 | * | 4/2004 | Knight | .................... F02B 39/10 60/608 |
| 7,703,283 B2 | * | 4/2010 | Barker | .................... F02B 39/10 60/608 |
| 8,225,608 B2 | * | 7/2012 | Wu | ......................... F02B 39/10 60/608 |
| 8,397,501 B2 | * | 3/2013 | Barker | .................... F02B 39/04 60/608 |
| 8,397,502 B2 | * | 3/2013 | Barker | .................... F02B 39/10 60/608 |

(Continued)

FOREIGN PATENT DOCUMENTS

| | | |
|---|---|---|
| DE | 3602543 A1 | 10/1987 |
| DE | 10022113 A1 | 11/2001 |

(Continued)

*Primary Examiner* — Thai Ba Trieu
(74) *Attorney, Agent, or Firm* — Dinsmore & Shohl LLP

(57) ABSTRACT

The invention is related to a compressor system (10) for a combustion engine (40), comprising a drive train (11), a compressor (12) and a first electric machine (20) mechanically coupleable by the drive train (11) with the combustion engine (40). Further the invention is related to a combustion engine (40) with a compressor system (10).

6 Claims, 3 Drawing Sheets

(56) References Cited

U.S. PATENT DOCUMENTS

| | | | | |
|---|---|---|---|---|
| 9,482,149 | B2* | 11/2016 | Barker | F02B 39/10 |
| 2004/0211398 | A1* | 10/2004 | Knight | F02B 39/10 |
| | | | | 123/559.1 |
| 2010/0170245 | A1* | 7/2010 | Amos | F02B 39/10 |
| | | | | 60/607 |
| 2013/0017920 | A1* | 1/2013 | Sherrill | F02B 39/04 |
| | | | | 475/183 |
| 2013/0172138 | A1* | 7/2013 | Sega | F02B 39/04 |
| | | | | 474/148 |
| 2013/0269342 | A1* | 10/2013 | Oh | F02B 39/04 |
| | | | | 60/607 |
| 2014/0026564 | A1* | 1/2014 | Jacobson | F02B 39/04 |
| | | | | 60/608 |
| 2015/0240917 | A1* | 8/2015 | Vermeulen | B60K 6/442 |
| | | | | 475/5 |
| 2015/0292398 | A1* | 10/2015 | Ambrosius | F02B 39/04 |
| | | | | 123/568.11 |
| 2016/0047298 | A1* | 2/2016 | Lofgren | F02B 39/04 |
| | | | | 417/374 |
| 2016/0305314 | A1* | 10/2016 | Epp | F02B 39/04 |

FOREIGN PATENT DOCUMENTS

| | | | | |
|---|---|---|---|---|
| DE | 102004029828 | A1 * | 1/2006 | F02B 39/04 |
| DE | 102012004394 | A1 | 9/2013 | |
| WO | WO 2009118520 | A1 * | 10/2009 | F02B 39/10 |
| WO | WO 2014029651 | A1 * | 2/2014 | B60K 6/442 |
| WO | WO 2016149123 | A1 * | 9/2016 | F02B 39/04 |

* cited by examiner

COMPRESSOR SYSTEM FOR A COMBUSTION ENGINE AND COMBUSTION ENGINE

CROSS-REFERENCE TO RELATED APPLICATIONS

This application claims priority of German Patent Application 10 2014 118 247.2 filed Dec. 9, 2014.

FIELD OF THE INVENTION

The present invention is related to a compressor system for a combustion engine, comprising a drive train, a compressor and a first electric machine mechanically coupleable by the drive train with the combustion engine. Further, the invention is related to a combustion engine with a compressor system.

BACKGROUND OF THE INVENTION

The use of compressors at combustion engines is generally known. By use of such compressors, often as a part of a turbo charger of the combustion engine, charged air fed to the combustion engine can be compressed. A higher efficiency of the combustion engine and a lower consumption can be achieved simultaneously. In addition to an actuation via an exhaust gas turbine, as is the case with a turbo charger, alternatively or additionally, an electrical actuation of the compressor is known. By the use of an at least partially electrically actuated compressor, for instance an improvement of responding properties, is possible. Such at least partially electrically actuated compressors, especially as part of a turbo charger, are for instance disclosed in DE 100 22 113 A1, DE 10 2012 004 394 A1 or DE 36 02 543 A1.

With compressors it emerged as a disadvantage that especially for mechanically actuated compressors, the acceleration especially at the beginning of an operation comprises high power consumption. When an electrical operation is performed, a high dissipation loss can turn out disadvantageously, especially during a continuous operation.

SUMMARY OF THE INVENTION

Therefore, it is a subject of the present invention to solve the aforesaid problems, at least partly. In particular, it is a subject of the invention to provide a compressor system for a combustion engine and a combustion engine, which allow an energy-efficient operation of the compressor in an especially easy and cost-efficient way, wherein simultaneously an impairment of an operation, in particular of the combustion engine, can be avoided.

Further features and details of the present invention result from the subclaims, the description and the drawings. Features and details discussed with respect to the compressor system according to the invention can also be applied to the combustion engine according to the invention and vice versa, so that in respect to disclosures of the respective aspects of the invention mutual references are made can be made respectively.

According to a first aspect of the invention the subject is achieved by a compressor system for a combustion engine, comprising a drive train, a compressor and a first electric machine mechanically coupleable by the drive train with the combustion engine. A compressor system according to the invention is characterized in that the drive train comprises a gearing device and that a second electrical machine is provided, wherein the gearing device is arranged in the drive train such that the second electrical machine each is mechanically coupleable by way of the gearing device with the first electrical machine and the compressor, respectively.

A compressor system according to the invention is designed for an assistance of a combustion engine. For this purpose, the compressor system comprises a compressor, which is especially designed for a compression of the charged air of the combustion engine. It is understood that a compressor system according to the invention comprises all necessary connection elements, for instance an air duct, in order to be able to transport the compressed air to the combustion engine, if in an installed state. Further, a compressor system according to the invention comprises a drive train by which a first electrical machine is coupleable to the combustion engine. Such a mechanical coupling can be provided for instance by a belt drive, a gear drive and/or a chain drive. Therefore a transport of mechanical energy, for instance in the form of rotational energy, can be enabled by the drive train internally in the compressor system and outwards to the combustion engine. The transport of the mechanical energy can especially take place in both directions, in particular from the combustion engine to the compressor system as well as from the compressor system to the combustion engine. An electrical machine according to the invention can be operated both as an electric motor and as a generator. In particular, by a mechanical coupling of the first electrical machine to the combustion engine via the drive train, a driving of the combustion engine, for instance during a starting sequence of the combustion engine, by a first electrical machine operated as an electrical motor as well as the production of electrical energy by a first electrical machine operated as a generator and driven by the combustion engine is possible.

A compressor system according to the invention further comprises a second electrical machine. This second electrical machine can be operated both as an electric motor and as a generator as well. The second electrical machine is coupleable to the first electrical machine via a gearing device, which is arranged in the drive train. Further, via the gearing device the second electrical machine is also coupleable to the compressor. Thereby an at least indirect coupling is possible between the first electrical machine and the compressor and especially between the combustion engine and the compressor respectively, in particular via the gearing device and the second electrical machine.

A compressor system according to the invention therefore allows driving of the compressor of the compressor system in different ways. It is for instance possible to solely drive the compressor by the first and/or the second electrical machine, which is then operated as an electric motor respectively. Thereby, in particular at the beginning of an operation of the compression system, it can be avoided that mechanical energy, necessary for the start-up of the compressor, is detracted from the combustion engine. Thereby, a drawback of the power of the engine, which in particular can often be operated only at reduced efficiency during the start-up, for instance due to a low operational temperature, can be avoided. At a later stage of the operation it can be in contrast advantageous to drive the compressor by an at least indirect mechanical coupling via the drive train by the combustion engine. At this point, the combustion engine is normally operated at high efficiency, so that the mechanical energy necessary for the operation of the compressor can be provided by the combustion engine without a drawback for a user of the combustion engine, for instance a driver of a vehicle propelled by the combustion engine, and without any disturbances for the user. This is also an advantage at a stationary operation, because a high electrical permanent load, which would be caused by a continuous driving of the compressor by one or both electrical machines, can be avoided. Therefore, both examples of driving modes of the compressor, electrical at a start-up and by the combustion engine at a stationary operation, allow an overall reduction of consumption and an increase in efficiency during the operation of the combustion engine respectively.

Altogether, with a compressor system according to the invention, by the different possibilities of coupling and driving modes of the two electrical machines, an especially high flexibility according the operation of the compressor system can be provided. For instance one or both electrical machines can be operated as electrical motors to drive or at least to support the combustion engine. This can in particular be advantageous at a start-up of the combustion engine, because additional electrical motors as starter can be avoided. Thereby, a high start-up comfort for a user of the combustion engine, which can in particular be arranged as a drive in a vehicle, can be provided. During continuous operation of the combustion engine by using one or both electrical machines operated as electrical motors, an overall achievable power and/or an achievable torque can be increased. This can be, if reasonable and/or necessary, carried out continuously. The increase in power and/or torque can be achieved on the one hand by additionally driving the combustion engine directly by the electrical machine(s), accordingly operated as electrical motor(s). On the other hand, also the compressor can be driven by one or both electrical machines, wherein the thus achievable compression of the charged air of the combustion engine also allows an increase of the achievable power and/or torque. Alternatively and/or additionally, one or both electrical machines can be operated as generators. Thereby, a recuperation of not required mechanical energy, stored in the combustion engine as well as in the compressor, by transformation in electrical energy, can be provided in a flexible way. Thereby, an economization of an additional generator, for instance a dynamo, can be provided by a compressor system according to the invention. In particular, by an operation of both electrical machines as generators the recuperated power can be increased further.

Further a compressor system according to the invention can be characterized in that a battery is provided, wherein the battery is electrically connected to the first and/or second electrical machine. A battery is an especially easy source of electrical energy. By using of an electrical connection, this electrical energy can be transported between the battery and the first and/or second electrical machine, in particular in both directions. Further, by providing an integration, especially a structural integration, of the battery into the compressor system, a compressor system according to the invention can be constructed, especially compact.

According to a further development, a compressor system according to the invention can be constructed such that the first and/or second electrical machine can be operated as a motor, wherein the battery provides electrical energy for the first and/or second electrical machine. An operation of the first and/or second electrical machine as electrical motor allows the transformation of electrical in mechanical energy. Thereby, in a compressor system according to the invention, in particular a driving of the compressor, but also a driving of the combustion engine, for instance during a start-up of the combustion engine, can be rendered possible. By using of a battery, the electrical energy needed for this purpose can especially easily be provided. Naturally, according to the invention, other electrical energy sources besides to a battery, for instance one or more fuel cells, solar cells of a generator, such as a dynamo can be used. Especially, preferred both electrical machines can be operated as electrical motors and can be provided with electrical energy from a common battery. An in particular simple construction of a compressor system according to the invention can thereby be provided.

Alternatively or additionally, a compressor system according to the invention can be further characterized in that the first and/or the second electrical machine can be operated as a generator, wherein the first and/or second electrical machine charges the battery. By operating the first and/or second electrical machine as a generator it is possible to transform mechanical energy into electrical energy. By doing so, it is possible, for instance during the operation that mechanical energy, which is produced by the combustion engine and at the same time not needed for driving the compressor, be transformed into electrical energy by one or both electrical machines. Thereby this excessive mechanical energy can be used at least partly and is at least not completely lost. It is further possible that mechanical energy, which is stored in the compressor at the end of an operation of the combustion engine and therefore of the compressor system, is transformed into electrical energy by an electrical machine operated as a generator. According to the invention, electrical energy produced in such a way can in particular be used to charge the battery. Thereby, storing of this produced electrical energy can be rendered possible. Naturally, it is possible to operate the two electrical machines independently from one another and consequently to use one of the two electrical machines as an electrical motor and to use the other of the two as a generator. Thereby especially versatile usage and operational modes for a compressor system according to the invention can be provided.

Also a compressor system according to the invention can be constructed such that in the drive train at least one clutch device for a separation of the mechanical coupling is provided. Especially by using such a clutch device, it is rendered possible to interrupt a transfer of mechanical energy through the drive train at a certain position. Naturally, also more than one of such clutch devices can be arranged in the drive train. Thereby, individual parts of a compressor system according to the invention can be driven independently from each other. An increase of the capabilities of a compressor system according to the invention can thereby be achieved.

According to an especial preferred embodiment of the compressor system according to the invention it can be provided that the clutch device is arranged in the drive train between two of the following devices:

combustion engine,
first electrical machine,
gearing device,
second electrical machine,
compressor.

It is understood that also more than one clutch devices can be arranged in the drive train. In this way, the drive train of a compressor system according to the invention is constructed separable by the clutch device in such a way that the most important building elements can be independently operated from each other. For instance, by using an arrangement of the clutch device immediate in front of the compressor, both electrical machines can be used to drive the combustion engine without driving the compressor at the same time, which is not needed at this point in time. Unnecessary energy consumption, caused by driving the compressor at this point of time, can thereby be avoided.

Naturally, via a corresponding arrangement of a clutch device in the compressor system, immediately after to the combustion engine or between the gearing device and the second electrical machine respectively, one or both electrical machines can stay mechanically connected to the compressor, wherein a mechanical connection to the combustion engine is interrupted. By doing so, for instance on the one hand a start-up of the compressor is possible independent of an operational mode of the combustion engine, on the other hand at an end of operation a recuperation of mechanical energy stored in the compressor by one or both electrical machines operated as generators is rendered possible. Further, a clutch device can also be arranged in the drive train in between the two electrical machines. A separation of the operation of the first electrical machine, which is mechanically coupled to the combustion engine, from the operation of the second electrical machine, which is mechanically coupled to the compressor, can thereby be rendered possible. Dependent on the mode of operation, naturally both electrical machines can independent be operated from each other as an electrical motor or as a generator. Overall, such an arrangement of one or more clutch devices in the drive train, a plurality of possibilities for an operation of a compressor system according to the invention can be provided or at least be improved.

Further, a compressor system according to the invention can be constructed such that the gearing device comprises a planetary gear, wherein the planetary gear comprises at least one sun gear, one planet carrier and one annular gear. A planetary gear is a very versatile gearing device, provided by its composition of at least a sun gear, a planet carrier and an annular gear, wherein naturally in the planet carrier planet gears can be arranged. In particular, a continuous change in rotational speed can be rendered possible by a planetary gear. Further, by blocking of one of the elements of the planetary gear for instance, different operational modes of a compressor system according to the invention can be provided very easily. In addition, by using a planetary gear, a coaxial arrangement of an input section and an output section of the drive train, especially of a shaft of the drive train, can be rendered possible. An especial compact construction of a compressor system according to the invention can thereby be provided.

An especially preferred compressor system according to the invention can be developed in such that the sun gear is mechanically coupled, especially directly mechanically coupled, to the compressor, the planet carrier to the second electrical machine and the annular gear to the first electrical machine, respectively. In this embodiment, for instance, the first electrical machine is directly coupleable to the combustion engine, wherein naturally in this connection a clutch device can be arranged. For instance, by blocking the compressor and thus the sun gear, both electrical machines are coupleable to the combustion engine and can drive it or can be driven by it, respectively. By blocking the planet carrier, the second electrical machine is likewise blocked. However, the sun gear and the annular gear rotate further, whereby for instance the first electrical machine can be operated as generator and/or the compressor can be driven directly by the combustion engine. If the annular gear is blocked, for instance caused by a standing combustion engine after the end of an operation of the combustion engine, the sun gear and the planet carrier can rotate further. This allows for instance an operation of the second electrical machine as generator for recuperation of mechanical energy stored in the compressor. Last but not least, naturally, also an operation of the planetary gear is possible with no blocked elements at all. A completely variable compressor capacity, for instance adjustable using a rotational speed of the compressor, can be adjusted in this case, in particular by the second electrical machine. Also, a simultaneous operation of one of the electrical machines as generator and of the other as electrical motor can thereby be rendered possible.

In a second possible embodiment, it can alternatively be provided that the sun gear is mechanically coupled, especially directly mechanically coupled, via the first electrical machine to the compressor, the planet carrier to the second electrical machine and the annular gear to the combustion engine, respectively. In this embodiment, the first electrical machine is coupleable directly to the compressor, wherein naturally, in this connection, a clutch device can be arranged. By blocking the compressor and thus the sun gear, also the first electrical machine is blocked. By doing so, only the second electrical machine is coupleable to the combustion engine and can drive it of can be driven by it, respectively. In turn, by a blockage of the planet carrier, only the second electrical machine is blocked. The sun gear and the annular gear are furthermore rotating, whereby for instance the first electrical machine can be operated as generator, and the compressor can be directly driven by the combustion engine. With a blocked annular gear, for instance caused by a standing combustion engine before the start of an operation of the combustion engine, the sun gear and the planet carrier can continue to rotate. This allows, for instance, driving the combustion engine using both electrical machines or, by applying an appropriate additional blocking of the planet carrier or of the sun gear, by one of the electrical machines. Also, in this embodiment, naturally an operation of the planetary gear is possible with no blocked elements at all. A completely variable compressor capacity, for instance adjustable using a rotational speed of the compressor, can be adjusted, in this case in particular by the second electrical machine. Also, a simultaneously operation of one of the electrical machines as generator and of the other as electrical motor can thereby be rendered possible.

Furthermore a compressor system according to the invention can be constructed such that a breaking device is provided, wherein the breaking device is enabled to block the compressor and/or the second electrical machine. A blocking of an element of the compressor system, in particular of the compressor and/or of the second electrical machine, which can be necessary as described above for different operational modes of a compressor system according to the invention, can especially easily be carried out by such a breaking device. Naturally, a breaking device can also be used for other elements of a compressor system according to the invention or, for instance, also only for a part of the gearing device, preferably of a planetary gear. In addition, also slowing the element down without completely blocking the element of the compressor system according to the invention is possible.

In addition a compressor system according to the invention can be characterized in that the compressor is part of a turbo charger of the combustion engine. A turbo charger especially comprises a turbine, which is often driven by exhaust gases of the combustion engine. This also is a possibility to drive a compressor of a compressor system. Naturally this driving can be alternatively or additionally used in respect to a driving using an electrical machine and/or a direct driving by the combustion engine. By using this embodiment of the compressor of a compressor system according to the invention as part of a turbo charger, an application spectrum and operational modes of a compressor system according to the invention can be enhanced further.

According to a second aspect of the invention, the subject is solved by a combustion engine with a compressor system. A combustion engine according to the invention is characterized in that the compressor system is constructed according to the first aspect of the invention. Correspondingly, a combustion engine according to the invention provides the same advantages, which have been discussed in detail according to a compression system according to the first aspect of the invention.

BRIEF DESCRIPTION OF THE DRAWINGS

Further advantages, features and details of the invention result from the following description, in which with reference to the figures embodiments of the invention are described in full detail. Features mentioned in the claims and in the description can be essential for the invention separately as well as in any combination. Elements with the same function or mode of action are labeled in the figures with identical references. It is schematically shown:

DETAILED DESCRIPTION OF THE INVENTION

In FIGS. 1, 2, 3, 4, 5 and 6, a possible embodiment of a combustion engine 40 according to the invention with a compressor system 10 according to the invention is schematically shown. The compressor system 10 according to the invention is shown in different conditions in the separate figures. In the following, the figures are therefore described together, wherein similarities and differences of the separate conditions of the compressor system 10 according to the invention will be described in detail.

Figure 4:
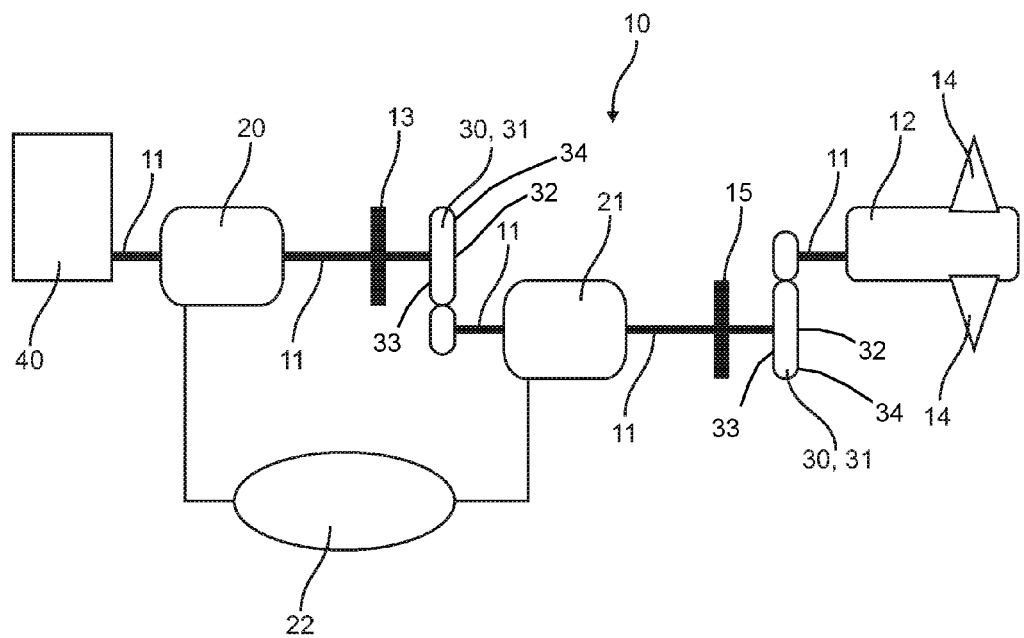

Each compressor system 10 according to the invention comprises a compressor 12, which is for instance enabled for a compression of charge air for the combustion engine 40. Further, a drive train 11 is provided, which especially enables and provides a mechanical coupling of the separate elements of the compressor system 10 to each other and in addition to the combustion engine 40. For instance, in the shown embodiment of the compressor system 10 according to the invention a first electrical machine 20 is mechanically coupled directly to the combustion engine 40 via the drive train 11. Following after the first electrical machine 20 a first clutch device 13 is arranged in the drive train 11, which allows an interruption of the mechanical coupling at this point. Then follows a first part of a gearing device 30, which is in particular constructed as a part of a planetary gear 31 in the shown embodiment. Advantages of such a planetary gear 31 are for instance the possibility of a continuous change of rotational speed or the possibility, to coaxially construct an input shaft and an output shaft of the drive train 11. Thus for instance, the drive train 11 can be at this position mechanically coupleable to an annular gear 34 of the planetary gear 31. Subsequently, a second electrical machine 21 is arranged in the drive train 11. At this position, for instance, also a coupling of the second electrical machine 21 to a planet carrier 33 of the planetary gear 31 is possible. A second clutch device 15 is followed by a gearing device 30, for instance a sun gear 32 of a planetary gear 31, which is mechanically coupled via a further section of the drive train 11 to the compressor 12. In FIG. 4, 5 a braking device 14 is additionally shown, wherein in FIG. 4 the braking device 14 is open and in FIG. 5 the compressor 12 is blocked by the closed braking device 14. Further, the shown embodiment of the compressor system 10 according to the invention provides a battery 22, which is electroconductively connected to the two electric machines 20, 21. In doing so, both electric machines 20, 21 can be operated independently of one another as electric motor and, simultaneously, be provided with electric energy by the battery 22. Naturally, also an alternative operation as a generator is possible, whereby the battery 22 can be charged. Of course, a compressor system 10 according to the invention also enables further, not illustrated embodiments. For instance, the first electrical machine 20 can also be arranged between the gearing device 30 and the compressor 12 and/or the combustion engine 40 can be directly mechanically coupled to the gearing device 30 or via the first clutch device 13. Also an alternative or additional arrangement of a braking device 14, for instance for slowing down and/or blocking the second electrical machine 21, is naturally possible.

Figure 1:
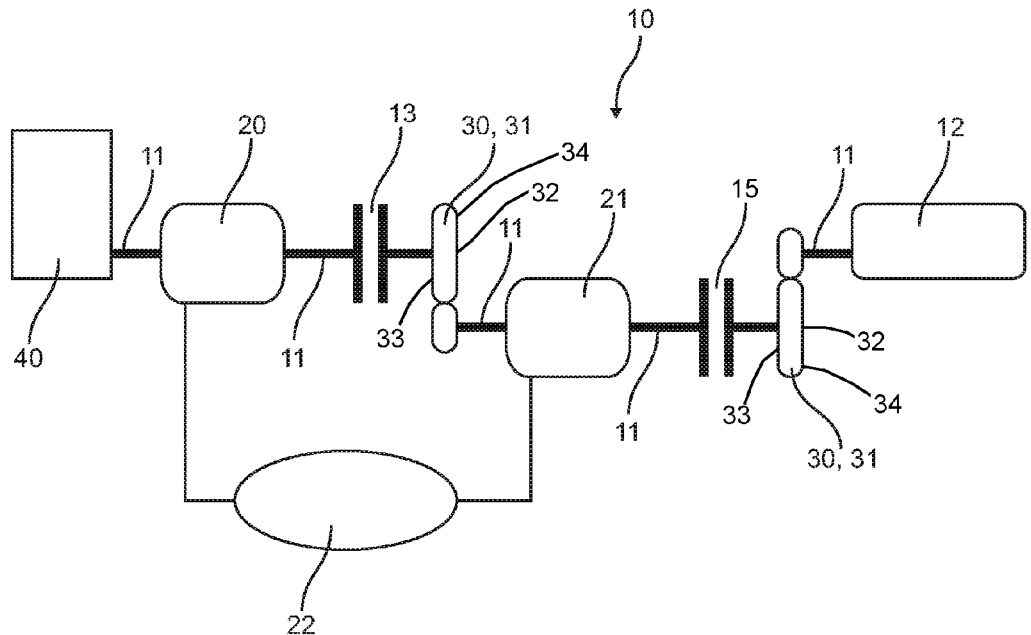
FIG. 1 a combustion engine with a compressor system in a first operational mode, FIG. 2 a combustion engine with a compressor system in a second operational mode, FIG. 3 a combustion engine with a compressor system in a third operational mode, FIG. 4 a combustion engine with a compressor system in a fourth operational mode, FIG. 5 a combustion engine with a compressor system in a fifth operational mode, and FIG. 6 a combustion engine with a compressor system and a turbo charger.

In FIG. 1 both clutch devices 13, 15 are opened. Thus, in the shown embodiment of a compressor system 10 according to the invention a mechanical coupling is present only between the first electrical machine 20 and the combustion engine 40. In this operational mode the compressor 12 is not driven by the compression system 10. However, a drive of the compressor 12 can in this case be provided from the outside, for instance by an embodiment of the compressor 12 as part of a turbo charger 43 (not shown) of the combustion engine 40. The mechanical coupling of the combustion engine 40 and the first electrical machine 20 and the electrical coupling of the first electrical machine 20 to the battery 22, respectively, in particular allow two operational modes. On the one hand a support of the combustion engine 40 by the first electrical machine 20 is possible. In this case the first electrical machine 20 is operated as an electrical motor and is provided with electrical energy by the battery 22. As an alternative, the first electrical machine 20 can be operated as a generator to charge the battery 22. In this case, the first electrical machine 20 is driven by the combustion engine 40.

Figure 2:
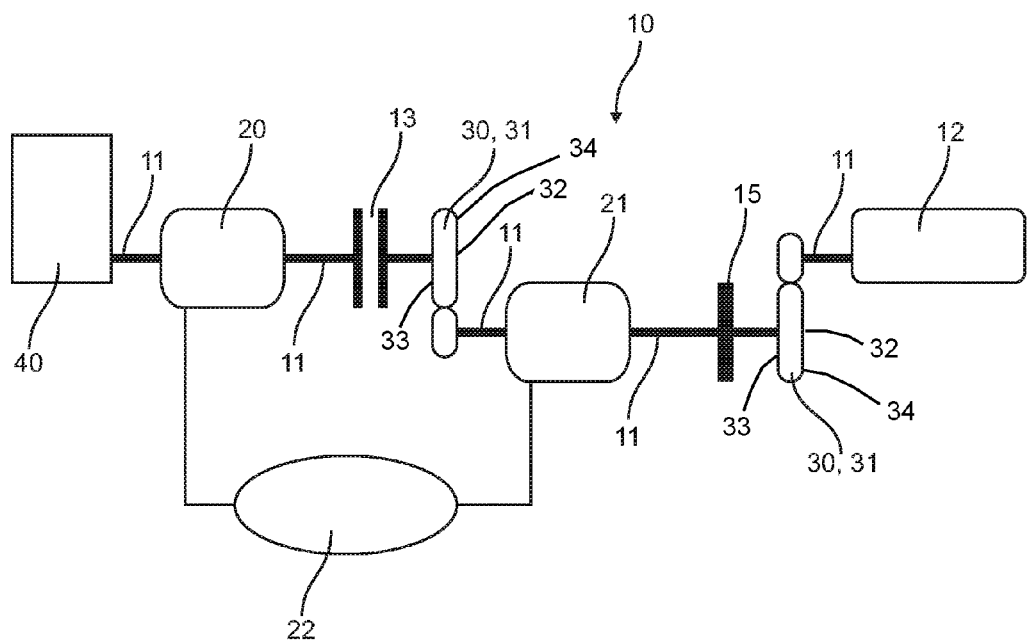

FIG. 2 shows another possible operational mode of a compressor system 10 according to the invention. Furthermore, at this point, the mechanical coupling between the first electrical machine 20 and a part of the gearing device 30 is interrupted by an opened clutch first device 13. However, the second clutch device 15 between the second electrical machine 21 and a part of the gearing device 30 is now closed. In this operational mode of a compressor system 10 according to the invention it is possible to operate the two electrical machines 20, 21 independently of one another, in particular relating to an operation as an electric motor or as a generator. Thus, for instance, as already described in respect to FIG. 1 the first electrical machine 20 can support the combustion engine 40 or alternatively be driven by it. Simultaneously, a pure electrical drive of the compressor 12 by a second electrical machine 21 operated as electrical motor can be provided. Naturally an operation of both electrical machines 20, 21 is not necessary. Thus, in this operational mode of a compressor system 10 according to the invention, for instance directly following an end of an operation of the combustion engine 40, a recuperation of mechanical energy still stored in the compressor 12 is possible using a second electrical machine 21 operated as a generator, whereby simultaneously the first electrical machine 20 is no longer operated at all.

Figure 3:
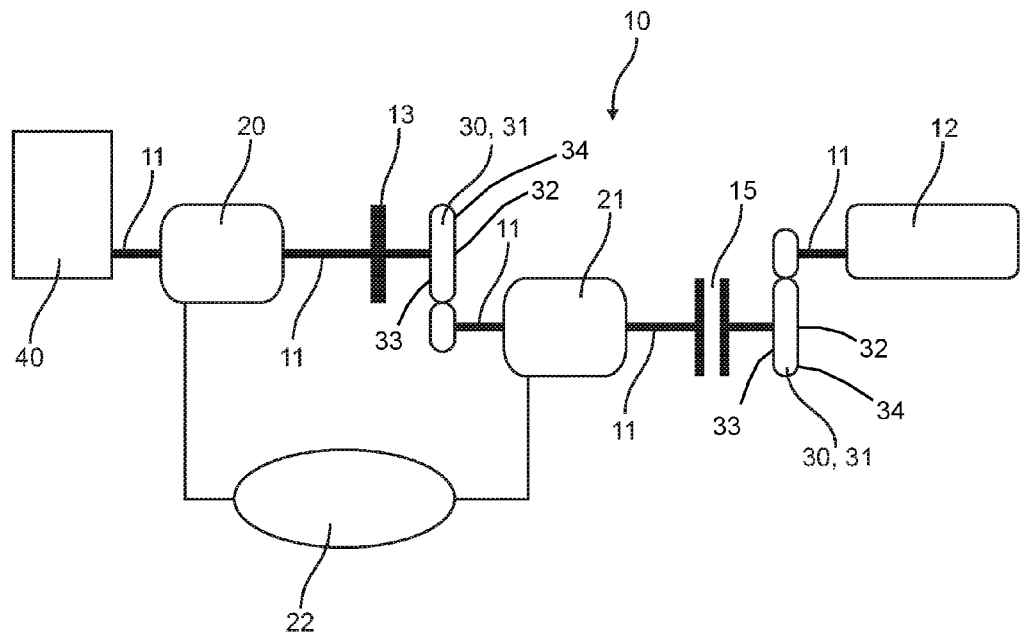

In FIG. 3 an operational mode is shown, in which both electrical machines 20, 21 are mechanically coupled to the combustion engine 40. However, a mechanical coupling of the compressor 12 to one of the electrical machines 20, 21 or to the combustion engine 40 is not provided by an opening of the respective second clutch device 15. This can be advantageous, for instance, during a start-up of the combustion engine 40, during which the combustion engine 40 can be started particularly fast by applying the force and in particular the torque of the electrical machines 20, 21, both operated as electrical motors. Vice versa, naturally a charging of the battery 22 can be carried out particularly fast, with both electrical machines 20, 21 operated as generators driven by the combustion engine 40. In particular, with a gearing device 30, which is constructed as a planetary gear 31, these operational modes of a compressor system 10 according to the invention can also be provided by a blockage, for instance of the compressor 12, which is mechanically coupled to a sun gear 32 of the planetary gear 31. This is shown in FIG. 4. In this figure the clutch devices 13, 15 are closed, but the compressor 12 is blocked by a braking device 14. The properties of the planetary gear 31 nevertheless allow an operation of both electrical machines 20, 21, both as an electrical motor and as a generator, and with all application possibilities and advantages already described above in respect to FIG. 3.

Figure 5:
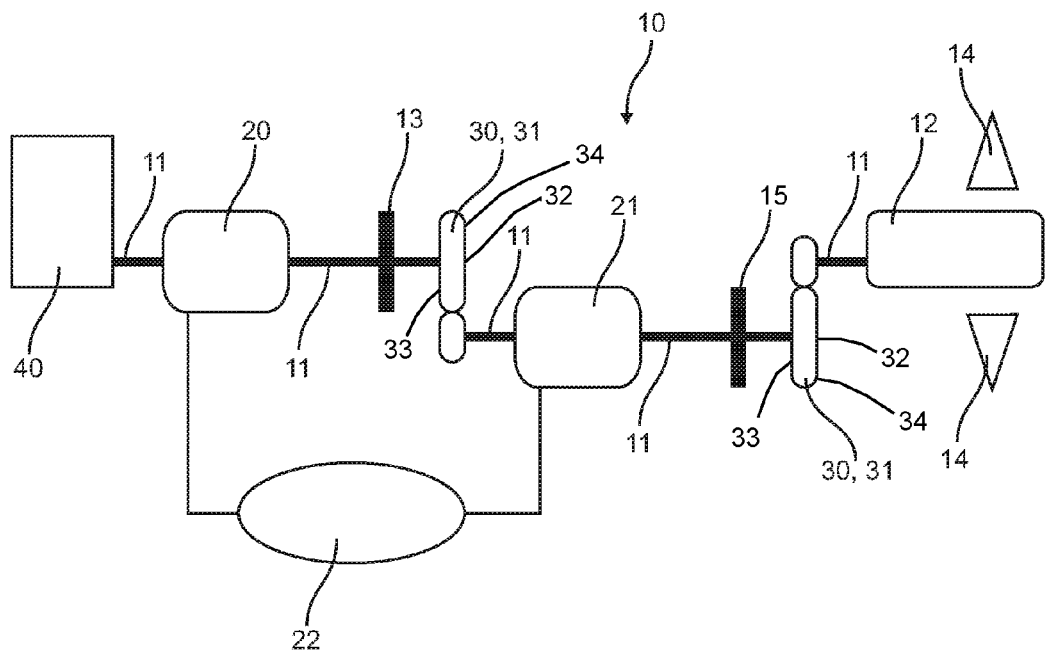

FIG. 5 shows another possible operational mode of a compressor system 10 according to the invention and of a combustion engine 40 according to the invention. In this operational mode all clutch devices 13, 15 are closed. This allows, for instance, to provide a direct drive of the compressor 12 by the combustion engine 40. Both electrical machines 20, 21 can be operated optionally and as circumstances require as a generator and/or an electrical motor. For instance, by using a second electrical machine 21 operated as an electrical motor, a speed and therefore a compressor capacity of the compressor 12 can be continuously adjusted and controlled by applying a variation of the speed of the electrical motor. The electrical power needed can be provided by the battery 22 but can naturally also be generated by the first electrical machine 20, which can be operated as a generator for this purpose. Further, also a support of the combustion engine 40 is naturally possible provided by one or both electrical machines 20, 21 operated as electrical motors.

Figure 6:
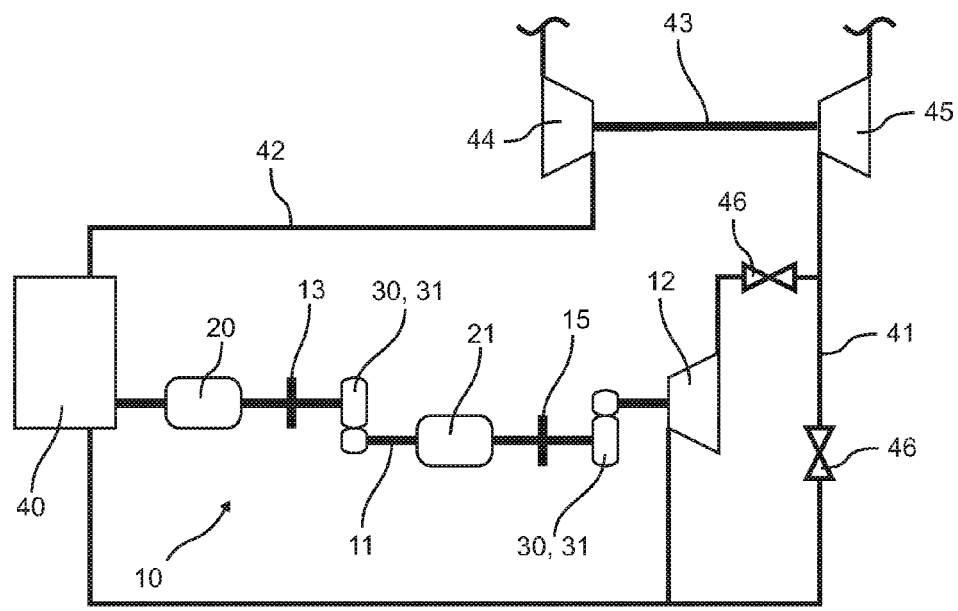

In FIG. 6 a combustion engine according to the invention is shown, which comprises in addition to a compressor system 10 according to the invention a turbo charger 43. The battery 22 of the compressor system 10 is not shown in this FIG. 6. The turbo charger 43 comprises a turbo charger turbine 44, which is arranged in an exhaust duct 42 of the combustion engine 40 and which is driven by an exhaust gas of the combustion engine 40. Via a mechanical coupling, for instance a shaft, this turbo charger turbine 44 drives a turbo charger compressor 45, which is arranged in an air duct 41 of the combustion engine 40. Thereby, a compression or a charging of a charge air of the combustion engine 40 can be provided, whereby in turn an increase of an achievable power and/or an achievable torque provided by the combustion engine 40 can be rendered possible. In particular, this compression or charging can be supported by the compressor 12 of a compression system 10 according to the invention. For this purpose, the compressor 12 is likewise arranged in the air duct 41, wherein an alternative or additional connection of the compressor 12 of the compressor system 10 according to the invention can be provided by valve devices 46. For this purpose, the compressor 12 can be driven in one of the operational modes described above, wherein in FIG. 6 a direct driving by the combustion engine 40 is shown, noticeable by the two closed clutch devices 13, 15. Alternatively, also a drive of the compressor 12 by one or both electrical machines 20, 21 is naturally possible. Overall, a further improved compression respectively or of the charge air of the combustion engine 40 can be provided.

The invention claimed is:

1. A compressor system for a combustion engine comprising:
   a combustion engine, a drive train, a first electrical machine, a second electrical machine, a compressor and a battery, wherein:
      the drive train extends from the combustion engine to the first electrical machine, from the first electrical machine to the second electrical machine, and from the second electrical machine to the compressor;
      the first electrical machine is positioned between the combustion engine and the second electrical machine and the second electrical machine is positioned between the first electrical machine and the compressor;
      the first electrical machine is mechanically coupled to the combustion engine via the drive train;
      the second electrical machine is mechanically coupled to the first electrical machine via a first clutch and a first gear device positioned between the first electrical machine and the second electrical machine;
      the compressor is mechanically coupled to the second electrical machine via a second clutch and a second gear device positioned between the second electrical machine and the compressor;
      the battery is in electrical communication with the first electric machine and the second electric machine.

2. The compressor system according to claim 1, wherein the compressor comprises a breaking device configured to block at least one of the compressor and the second electrical machine.

3. The compressor system according to claim 1, wherein the first electrical machine and the second electrical machine is operated as a motor and the battery provides electrical energy for the first electrical machine and the second electrical machine.

4. The compressor system according to claim 1, wherein the first electrical machine and the second electrical machine is operated as a generator and the first electrical machine and the second electrical machine charge the battery with electrical energy.

5. The compressor system according to claim 1, wherein the gearing device comprises a planetary gear and the planetary gear comprises at least one sun gear, one planet carrier and one annular gear.

6. The compressor system according to claim 1, further comprising a turbo charger, wherein the compressor is connected to the turbo charger.

* * * * *